US010800247B2

(12) United States Patent
Paterno et al.

(10) Patent No.: US 10,800,247 B2
(45) Date of Patent: Oct. 13, 2020

(54) HYBRID VEHICLE POWERTRAIN WITH MANUAL TRANSMISSION

(71) Applicant: Ford Global Technologies, LLC, Dearborn, MI (US)

(72) Inventors: Eric Paterno, Detroit, MI (US); Eric David Bramson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 738 days.

(21) Appl. No.: 15/437,926

(22) Filed: Feb. 21, 2017

(65) Prior Publication Data

US 2018/0236866 A1    Aug. 23, 2018

(51) Int. Cl.
*F16H 59/02*    (2006.01)
*B60K 6/44*    (2007.10)
*B60K 6/36*    (2007.10)
*B60K 6/40*    (2007.10)

(52) U.S. Cl.
CPC ............ *B60K 6/44* (2013.01); *B60K 6/36* (2013.01); *B60K 6/40* (2013.01); *F16H 59/02* (2013.01);
(Continued)

(58) Field of Classification Search
CPC ............ B60K 6/44; F16H 59/0204; F16H 2059/0221
(Continued)

(56) References Cited

U.S. PATENT DOCUMENTS 6,540,631 B2 * 4/2003 Holmes .................. B60K 6/365
  475/5
7,713,164 B2 * 5/2010 Silveri .................. B60W 20/30
  477/5
(Continued)

FOREIGN PATENT DOCUMENTS

EP    2548780    1/2013
EP    2792563    10/2014
(Continued)

OTHER PUBLICATIONS

2015 Honda CR-Z—Performance—Retrieved from http://automobiles.honda.com/2015/crz/performance.aspx on Nov. 21, 2016.

*Primary Examiner* — Ha Dinh Ho
(74) *Attorney, Agent, or Firm* — David Kelley, Esq.; Carlson, Gaskey & Olds. P.C.

(57) ABSTRACT

An exemplary powertrain assembly includes a first electric machine that selectively drives one or more wheel driveshafts, and a second electric machine that, through a manual transmission, selectively drives one or more wheel driveshafts. An engine, through the manual transmission, selectively drives the same wheel driveshaft selectively driven by the second electric machine. An exemplary vehicle control method includes, in an automatic transmission mode, selectively driving a wheel driveshaft with torque from a first electric machine, and selectively rotating a second electric machine with an engine. The second electric machine generates electric power that is supplied to the first electric machine. In a manual transmission mode, the method selectively applies torque to a wheel driveshaft with torque from an engine that is moved through a manual transmission.

19 Claims, 12 Drawing Sheets

(52) U.S. Cl.
CPC ....... *B60Y 2200/92* (2013.01); *F16H 59/0204* (2013.01); *F16H 2059/0221* (2013.01); *Y02T 10/623* (2013.01); *Y02T 10/6243* (2013.01); *Y02T 10/6265* (2013.01); *Y02T 90/14* (2013.01); *Y10S 903/951* (2013.01)

(58) Field of Classification Search
USPC .......................................................... 74/661
See application file for complete search history.

(56) References Cited

U.S. PATENT DOCUMENTS

| | | | | |
|---|---|---|---|---|
| 7,722,499 | B2* | 5/2010 | Soliman | B60K 6/445 |
| | | | | 477/5 |
| 7,806,802 | B2* | 10/2010 | Silveri | B60K 6/485 |
| | | | | 477/5 |
| 7,841,433 | B2 | 11/2010 | Soliman et al. | |
| 8,249,768 | B2* | 8/2012 | Mori | B60K 6/445 |
| | | | | 701/22 |
| 8,523,734 | B2* | 9/2013 | Mepham | B60K 6/36 |
| | | | | 477/3 |
| 9,005,077 | B2* | 4/2015 | Kim | B60K 6/52 |
| | | | | 180/65.28 |
| 9,188,201 | B2* | 11/2015 | Liu | B60K 6/365 |
| 9,562,592 | B2* | 2/2017 | Rekow | B60W 30/188 |
| 10,279,799 | B2* | 5/2019 | De Hesselle | B60W 40/101 |
| 2016/0221470 | A1 | 8/2016 | Ito | |

FOREIGN PATENT DOCUMENTS

| | | |
|---|---|---|
| JP | 2008001258 | 1/2008 |
| JP | 5779954 | 9/2015 |

\* cited by examiner

HYBRID VEHICLE POWERTRAIN WITH MANUAL TRANSMISSION

TECHNICAL FIELD

This disclosure relates generally to a powertrain of a hybrid vehicle. The powertrain incorporates a manual transmission.

BACKGROUND

Hybrid vehicles differ from conventional motor vehicles because, among other things, hybrid vehicles are selectively driven using one or more electric machines powered by a traction battery. The electric machines can drive the hybrid vehicles instead of, or in addition to, an internal combustion engine. Example hybrid vehicles include hybrid electric vehicles (HEVs), plug-in hybrid electric vehicles (PHEVs), etc.

Some hybrid vehicles include automatic transmissions that operate without requiring a driver to depress a shift pedal to disengage a clutch. Some hybrid vehicles can include a continuously variable transmissions (CVT) to adjust gear ratios between an internal combustion engine and wheels of the hybrid vehicle.

Manual transmissions, in contrast to automatic transmissions, require a driver to manually shift between fixed gears ratios. The driver shifts by depressing a clutch pedal to disengage a clutch, and then repositioning a gearshift within a shift gate.

SUMMARY

A powertrain assembly according to an exemplary aspect of the present disclosure includes, among other things, a first electric machine that selectively drives one or more wheel driveshafts within a plurality of wheel driveshafts, and a second electric machine that, through the manual transmission, selectively drives one or more wheel driveshafts within the plurality of wheel driveshafts. An engine, through a manual transmission, selectively drives the same wheel driveshaft selectively driven by the second electric machine.

In a further non-limiting embodiment of the foregoing assembly, the one or more wheel driveshafts selectively driven by the first electric machine are a first wheel driveshafts, and the one or more wheel driveshafts selectively driven by the second electric machine are second wheel driveshafts. A first axle of a vehicle comprises the first wheel driveshafts, and a second axle of the vehicle comprises the second wheel driveshafts.

In a further non-limiting embodiment of any of the foregoing assemblies, the first axle is a rear axle of the vehicle and the second axle is a front axle of the vehicle.

In a further non-limiting embodiment of any of the foregoing assemblies, the one or more wheel driveshafts selectively driven by the first electric machine are the same as the one or more wheel driveshafts selectively driven by the second electric machine.

In a further non-limiting embodiment of any of the foregoing assemblies, the engine selectively drives the second electric machine to generate electrical power that charges a traction battery, powers the first electric machine, or both.

In a further non-limiting embodiment of any of the foregoing assemblies, the assembly includes a clutch that moves between an engaged position where the engine and the second electric machine are rotatably coupled to the manual transmission, and a disengaged position where the engine and the second electric machine are rotatably decoupled from the manual transmission.

In a further non-limiting embodiment of any of the foregoing assemblies, the manual transmission includes a plurality of selectable gear positions, each providing a different gear ratio through which the engine, the second electric machine, or both can drive the one or more wheel driveshafts.

A further non-limiting embodiment of any of the foregoing assemblies includes a gearshift moveable between an automatic drive region and a manual shift region. The manual transmission is in neutral when the gearshift is in the automatic drive region.

A further non-limiting embodiment of any of the foregoing assemblies includes powertrain controller configured to selectively start the second electric machine to assist with starting the engine.

In a further non-limiting embodiment of any of the foregoing assemblies, the first electric machine is configured to charge a traction battery with power generated by regenerative braking the one or more wheel driveshafts selectively driven by the first electric machine, and the second electric machine is configured to charge the traction battery with power generated by regenerative braking the one or more wheel driveshafts selectively driven by the second electric machine through the manual transmission.

A vehicle control method according to an exemplary aspect of the present disclosure includes, among other things, in an automatic transmission mode, selectively driving at least one wheel driveshaft within a plurality of wheel driveshafts with torque from a first electric machine, and selectively rotating a second electric machine with an engine. The second electric machine generates electric power that is supplied to the first electric machine. In a manual transmission mode, the method selectively drives at least one wheel driveshaft within the plurality of wheel driveshafts with torque from an engine that is moved through a manual transmission.

In a further non-limiting embodiment of the foregoing method, the at least one wheel driveshaft selectively driven with torque from the first electric machine is a first wheel driveshaft, and the at least one wheel driveshaft selectively driven with torque from the engine is a second wheel driveshaft. A first axle of a vehicle comprises the first wheel driveshaft, and a second axle of the vehicle comprises the second wheel driveshaft.

In a further non-limiting embodiment of any of the foregoing methods, the first axle is a rear axle and the second axle is a front axle.

A further non-limiting embodiment of any of the foregoing methods includes, in the manual transmission mode, selectively applying torque to the first wheel driveshaft with torque from the first electric machine.

A further non-limiting embodiment of any of the foregoing methods includes, in the manual transmission mode, selectively applying torque to the second wheel driveshaft with torque from the second electric machine.

In a further non-limiting embodiment of any of the foregoing methods, the method includes selectively powering the first electric machine, the second electric machine, or both the first and second electric machines with power from a traction battery.

In a further non-limiting embodiment of any of the foregoing methods, the method includes driving the second electric machine to selectively charge the traction battery, to send electric power to first electric machine, or both.

In a further non-limiting embodiment of any of the foregoing methods, the method includes shifting a shift lever within a shift gate to change a gear ratio within the manual transmission.

In a further non-limiting embodiment of any of the foregoing methods, the method includes transitioning a clutch from an engaged position to a disengaged position so that the clutch is in a disengaged position when shifting to change the gear ratio, and depressing a clutch pedal to initiate the transitioning.

In a further non-limiting embodiment of any of the foregoing methods, the method includes moving a shift lever within a shift gate to change from the manual transmission mode to the automatic transmission mode, and from the automatic transmission mode back to the manual transmission mode.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure is directed toward a powertrain of a hybrid vehicle. The powertrain incorporates a manual transmission. A driver can operate the hybrid vehicle in an automatic transmission mode with the manual transmission in neutral. The driver can also operate the hybrid vehicle in a manual transmission mode, where the driver manually shifts gears of the manual transmission by, for example, depressing a clutch pedal and repositioning a gearshift within a shift gate.

Figure 1:
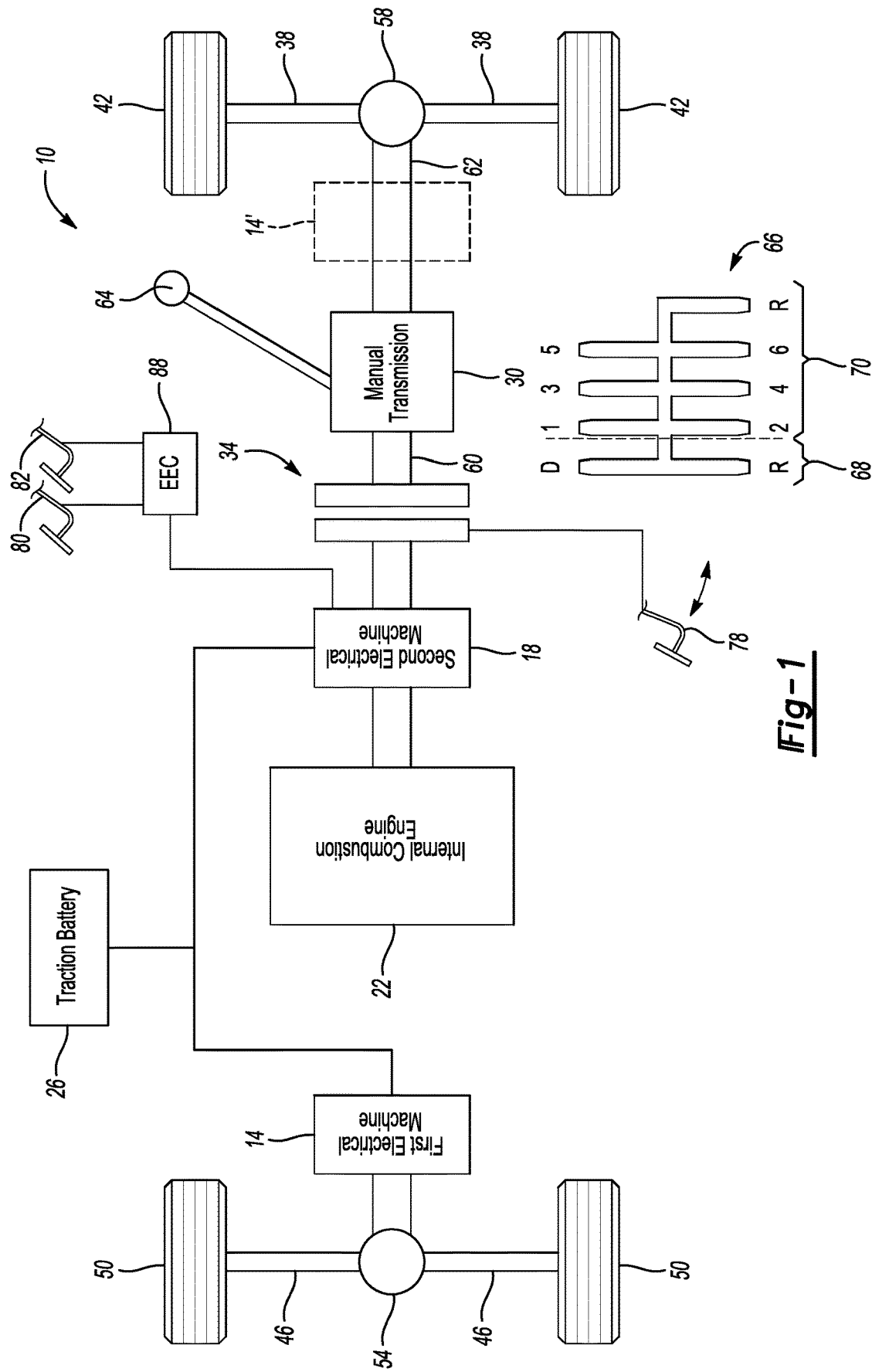
FIG. 1 illustrates a schematic view of an example powertrain for an electrified vehicle.

FIG. 1 illustrates an example powertrain assembly 10 for an electric vehicle. Although depicted as a hybrid electric vehicle (HEV), it should be understood that the concepts described herein are not limited to the specific HEV disclosed, and could extend to any other types of electrified vehicles, including, but not limited to, plug-in hybrid electric vehicles (PHEVs), etc.

The powertrain 10 includes a first electric machine 14, a second electric machine 18, an internal combustion engine 22, a traction battery 26, a manual transmission 30, and a clutch 34. The powertrain 10 further includes wheel driveshafts 38 connected to respective front wheels 42, and wheel driveshafts 46 connected to respective rear wheels 50. The wheel driveshafts 38 together provide a front axle. The wheel driveshafts 46 together provide a rear axle.

In examples where the powertrain 10 is used within a PHEV, the traction battery 26 could be charged by plugging into an external electric power source, such as a charging station.

In this exemplary non-limiting embodiment, the first electric machine 14 is an electric rear axle drive (eRAD). The first electric machine 14 is powered from the traction battery 26. The first electric machine 14 can operate to rotate a differential 54, which rotates the wheel driveshafts 46 to drive the rear wheels 50.

In some examples, the first electric machine 14 can be used for regenerative braking where regenerative torque from the wheel driveshafts 46 rotates the first electric machine 14 to generate power that is used to charge the traction battery 26.

The second electric machine 18 is also powered from the traction battery 26. When the clutch 34 is engaged and the manual transmission 30 is in a gear, the second electric machine 18 can operate to rotate a differential 58, which rotates the wheel driveshafts 38 to drive the front wheels 42. As will be explained, the internal combustion engine 22 can also be used to selectively rotate the wheel driveshafts 38.

Thus, in this exemplary, non-limiting embodiment, the driveshafts 38 are selectively driven by the second electric machine 18, the internal combustion engine 22, or both. Also, the driveshafts 46 are selectively driven by the first electric machine 14. In another embodiment, the first electric machine, the second electric machine, and the internal combustion engine could each selectively drive the same driveshaft or driveshafts. That is, the first electric machine, the second electric machine, and the internal combustion engine could each selectively drive the driveshafts of a front axle. In such an embodiment, the first electric machine 14 could be repositioned to be between the manual transmission 30 and the differential 58 while still remaining electrically connected to the traction battery 26. The repositioning of the first electrical machine 14 in such the embodiment is represented by box 14' in FIG. 1.

Referring again to the embodiment of FIG. 1 where the first electrical machine 14 is used to selectively drive the driveshafts 46, when the second electric machine 18 is used to drive the wheel driveshafts 38, the clutch 34 is in an engaged position and the manual transmission 30 is in gear.

The second electric machine 18 can also be used for regenerative braking where regenerative torque from the wheel driveshafts 38 drives the second electric machine 18 to generate power that is used to charge the traction battery 26. When regenerative braking using the second electric machine 18, the clutch 34 is in an engaged position.

The second electric machine 18 can also act as a generator where the internal combustion engine 22 drives the second electric machine 18 to generate power that is used to charge the traction battery 26, power the first electric machine 14, or both. In the exemplary non-limiting embodiment, the internal combustion engine 22 is coupled to the second electric machine 18 without adjustable gears between the internal combustion engine 22 and the second electric machine 18. The rotational speed of the second electric machine 18 thus varies linearly with the rotational speed of internal combustion engine 22.

In another non-limiting embodiment, the internal combustion engine 22 is rotatably coupled to the second electric machine 18 through an adjustable gear set (not shown), such as a planetary gear set. Of course, other types of adjustable gear sets, including other gear sets and transmissions, can be used to couple the internal combustion engine 22 to the second electric machine 18. The adjustable gear set permits adjustments to the rotational speed of the second electric machine 18 relative to the rotational speed of the internal combustion engine 22.

In another non-limiting embodiment, the internal combustion engine 22 is rotatably coupled to the second electric machine 18 through a disconnect clutch different from the clutch 34.

The manual transmission 30 controls a rotational speed of a first shaft 60 relative to a rotational speed of a second shaft 62. The manual transmission 30 can include a set of gears that are repositioned to change a gear ratio between the first shaft 60 and the second shaft 62. The manual transmission 30 can be decoupled from other portions of the powertrain 10 by moving the clutch 34 from the engaged position to a disengaged position.

A driver can choose between operating the exemplary powertrain 10 in the automatic transmission mode or the manual transmission mode. In the automatic transmission mode, the manual transmission 30 is in a neutral position where the first shaft 60 and the second shaft 62 are free to rotate relative to each other. That is, when the manual transmission 30 is in the neutral position, the first shaft 60 is not coupled in rotation together with the second shaft 62. In the manual transmission mode, the first shaft 60 is coupled in rotation together with the second shaft 62. In the manual transmission mode, the driver can manually change a gear ratio of the manual transmission 30 to change the rotational speed of the first shaft 60 relative to the second shaft 62.

In an exemplary non-limiting embodiment, the driver can move a gearshift 64 within a shift gate 66 to change between the automatic transmission mode and the manual transmission mode. The manual transmission 30 is shifted to neutral in response to the driver shifting to an automatic transmission mode from a manual transmission mode. In the manual transmission mode, the driver can move the gearshift 64 within the shift gate 66 to change the gear ratio within the manual transmission 30.

The shift gate 66 includes an automatic drive region 68 and a manual shift region 70. Positioning the gearshift 64 within the automatic drive region 68 causes the manual transmission 30 to move to a neutral position. Within the automatic drive region 68, the driver can position the gearshift 64 in a position D where the powertrain 10 drives the vehicle in a forward direction, or a position R where the vehicle is driven in a rearward direction.

If the driver desires to operate the powertrain 10 in the manual transmission mode, the driver moves the gearshift 64 to the manual shift region 70. Within the manual shift region 70, the driver can position the gearshift 64 within a reverse gear or within one of six forward gears. If the gearshift 64 is within the manual shift region 70, but not in the reverse gear or within one of the six forward gears, the manual transmission 30 is in a neutral position. Although the disclosed non-limiting embodiment includes the manual shift region 70 with six forward gears, other examples could include manual shift regions having more than six or less than six forward gears.

In the manual transmission mode, the driver can control gear ratios between the first shaft 60 and the second shaft 62. When the powertrain 10 is in the manual transmission mode, manually shifting into a gear that would overspeed the internal combustion engine 22 can be prevented by, for example, a lockout on the gearshift 64.

When moving the gearshift 64, the driver can depress a clutch pedal 78 to cause the clutch 34 to move from an engaged position to the disengaged position. Then, when the gearshift 64 is in a desired position, the driver lifts off the clutch pedal 78 to cause the clutch 34 to move back to the engaged position. A rotational input can move through the clutch 34 when the clutch 34 is in the engaged position, but not when the clutch 34 is in the disengaged position.

In some examples, the manual transmission 30 is an automated manual transmission where the driver manually shifts between gears when in the manual transmission mode without requiring the driver to depress the clutch pedal 78. The driver could, for example, shift between gears using paddle shifters, which could be located behind a steering wheel of the vehicle relative to the driver.

Moving the gearshift 64 within the shift gate 66 across the boundary from the automatic drive region 68 to the manual shift region 70 can automatically start the internal combustion engine 22 so that the internal combustion engine 20 can drive the wheel driveshafts 38 through the manual transmission 30. When the gearshift 64 is in a numbered gear or reverse "R" of the manual shift region 70, the powertrain 10 can operate in, for example, a parallel hybrid mode, with the first electric machine 14 driving the wheel driveshafts 46 and the internal combustion engine 22 driving the wheel driveshafts 38. Notably, actuating the clutch pedal 34 is used when switching between the numbered gears or reverse "R" gear of the manual shift region 70. Actuating the clutch pedal 34 to disengage clutch 34 is not, in this example, required when moving the shift lever 64 across the boundary between the automatic drive region 68 and the manual shift region 70, or when moving between automatic gears.

When the gearshift 64 is in the automatic drive region 68, the powertrain 10 is in an automatic transmission mode where the manual transmission 30 is in neutral and the powertrain 10 is, for example, operated in a series hybrid or pure electric mode (RWD). In the automatic transmission mode, a powertrain controller can command the internal combustion engine 22 to start in order to provide power to the traction battery 26 or the first electric machine 14.

In this exemplary non-limiting embodiment, the driver can depress an accelerator pedal 80 to request an acceleration of the vehicle using the powertrain 10. The driver can depress a brake pedal 82 to request a deceleration of the vehicle using the powertrain 10.

The driver can operate the powertrain 10 in various ways. The driver can, for example, choose to rely on some combination of the first electric machine 14, the second electric machine 18, or the internal combustion engine 22 to provide drive torque. Some of these various ways will be discussed below.

Driving while Charging

Figure 2:
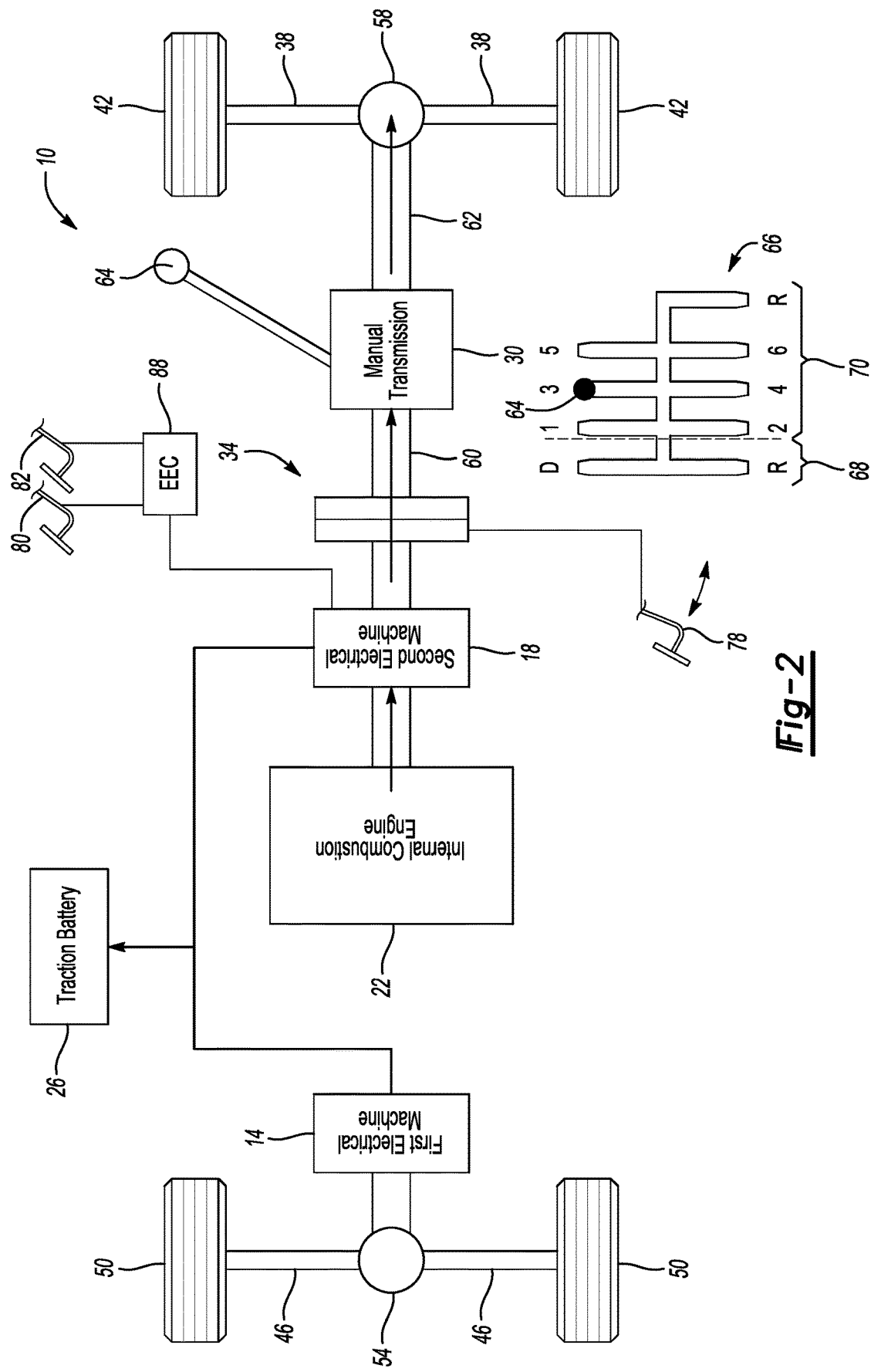
FIG. 2 schematically illustrates power flow when the FIG. 1 powertrain is in a manual transmission mode and driving while charging.

Referring to FIG. 2, power flow through the powertrain 10 is shown while the powertrain 10 is driving while charging and while the powertrain 10 is in a manual transmission mode. When driving while charging, the powertrain 10 rotates the front wheels 42, through the manual transmission 30, with a rotational output from the internal combustion engine 22. The clutch 34 is moved to the engaged position to permit the rotational output from the internal combustion engine 22 to drive the wheel driveshafts 38 through the manual transmission 30.

When driving while charging, the driver can manually shift the powertrain 10 to step up or step down rotation of the first shaft 60 relative to the second shaft 62. Here the gearshift 64 is positioned within the shift gate 66 in a position corresponding to the manual transmission 30 being in third gear.

When driving while charging, the rotational output from the internal combustion engine 22 can also rotate the second electric machine 18 to generate power used to recharge the traction battery 26. The first electric machine 14 can remain off when driving while charging such that the vehicle is in operated in front wheel drive.

All Wheel Drive

Figure 3:
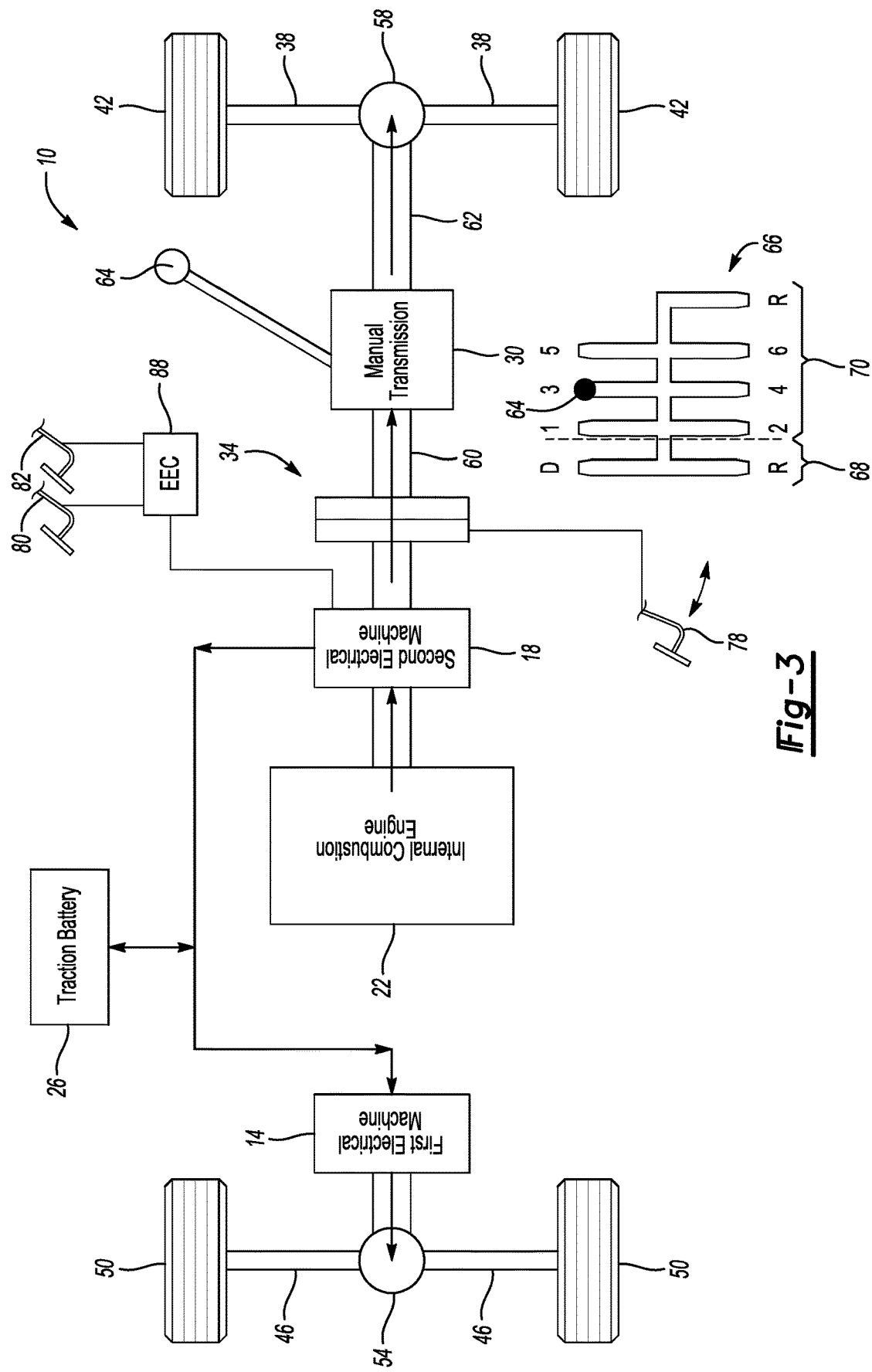
FIG. 3 schematically illustrates power flow when the FIG. 1 powertrain is in the manual transmission mode and in all wheel drive.

Referring now to FIG. 3, power flow through the powertrain 10 is shown when the powertrain 10 is in all-wheel drive and while the powertrain 10 is in a manual transmission mode. In all wheel drive, the wheel driveshafts 38 are driven with torque from the internal combustion engine 22, and the wheel driveshafts 46 are driven with torque from the first electric machine 14. The internal combustion engine 22 can additionally drive the second electric machine 18 to generate power to recharge the traction battery 26 or supply power to the first electric machine 14.

Boosted all Wheel Drive

Figure 4:
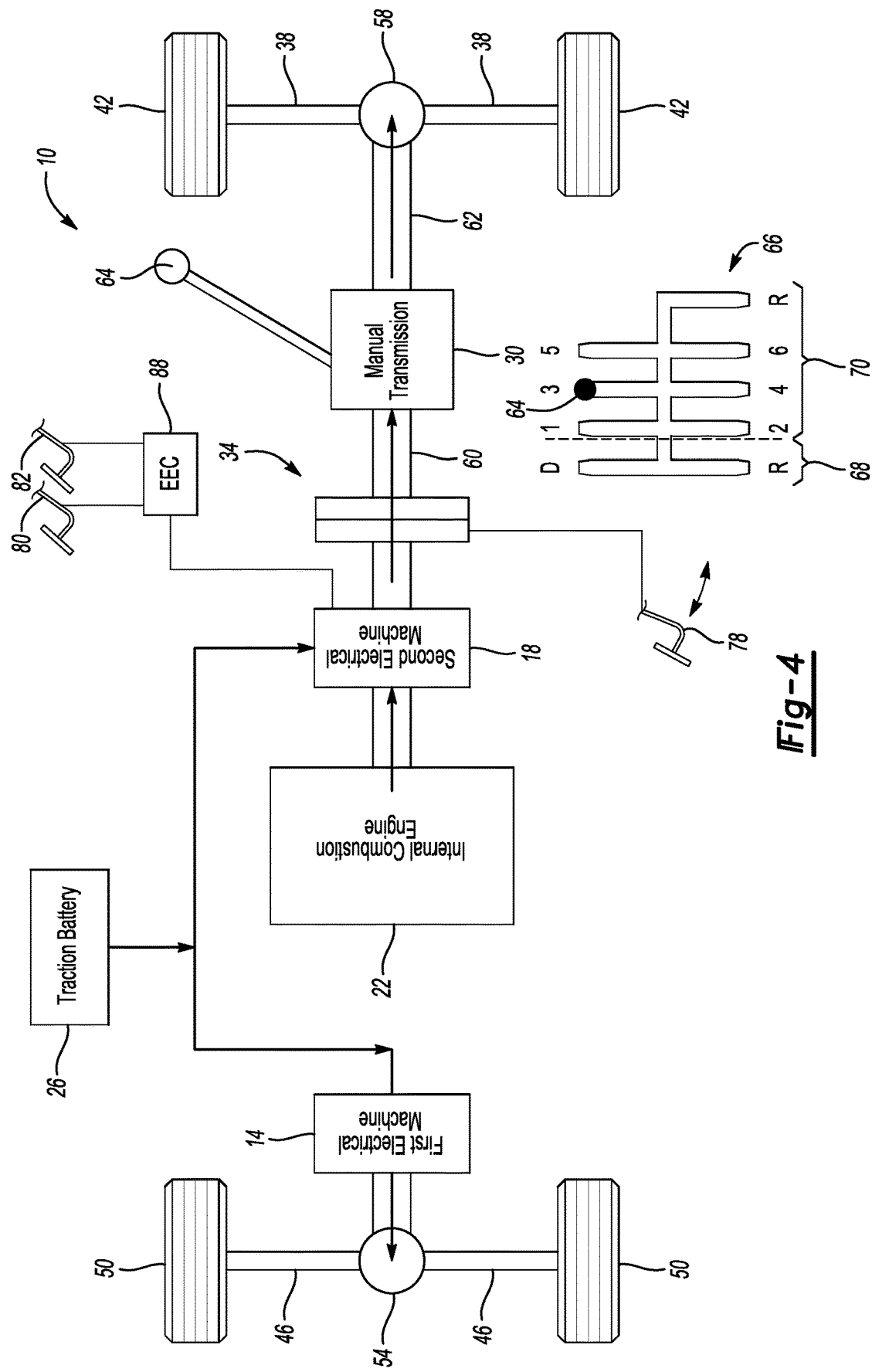
FIG. 4 schematically illustrates power flow when the FIG. 1 powertrain is in the manual transmission mode and in boosted, all-wheel drive.

Referring now to FIG. 4, power flow through the powertrain 10 is shown with the internal combustion engine 22 and the second electric machine 18 both providing output torque to drive the wheel driveshafts 38 and while the powertrain 10 is in a manual transmission mode. Additionally, the first electric machine 14 provides output torque to drive the wheel driveshafts 46.

Power from the traction battery 26 powers both the first electric machine 14 and the second electric machine 18 when the powertrain 10 is in boosted, all-wheel drive.

When the powertrain 10 is in, for example, boosted all-wheel drive, a torque request to the first electric machine 14 can be attenuated by the position of the clutch pedal 78 such that the torque command to the first electric machine 14 is zero when the clutch pedal 78 is fully depressed. The torque command to the first electric machine 14 is effectively modulated by the position (0-100%) of the clutch pedal 78, such that the torque from the first electric machine 14 is 100% of the command when the clutch pedal 78 is fully released. This allows the torque profile of the first electric machine 14 to follow the transmitted torque from the internal combustion engine 22 during a clutch release event to match traditional behavior of a manual transmission.

If the gearshift 64 is in a neutral position or the clutch pedal 78 is fully depressed, a throttle input does not generate a torque command to the first electric machine 14. This allows the throttle to be used to rev-match into a chosen gear of the manual transmission 30 without changing the wheel torque. Braking torque via the first electric machine 14 can be permitted when the gearshift 64 in a neutral position or when the clutch pedal 78 is fully depressed.

Boosted, Front Wheel Drive

Figure 5:
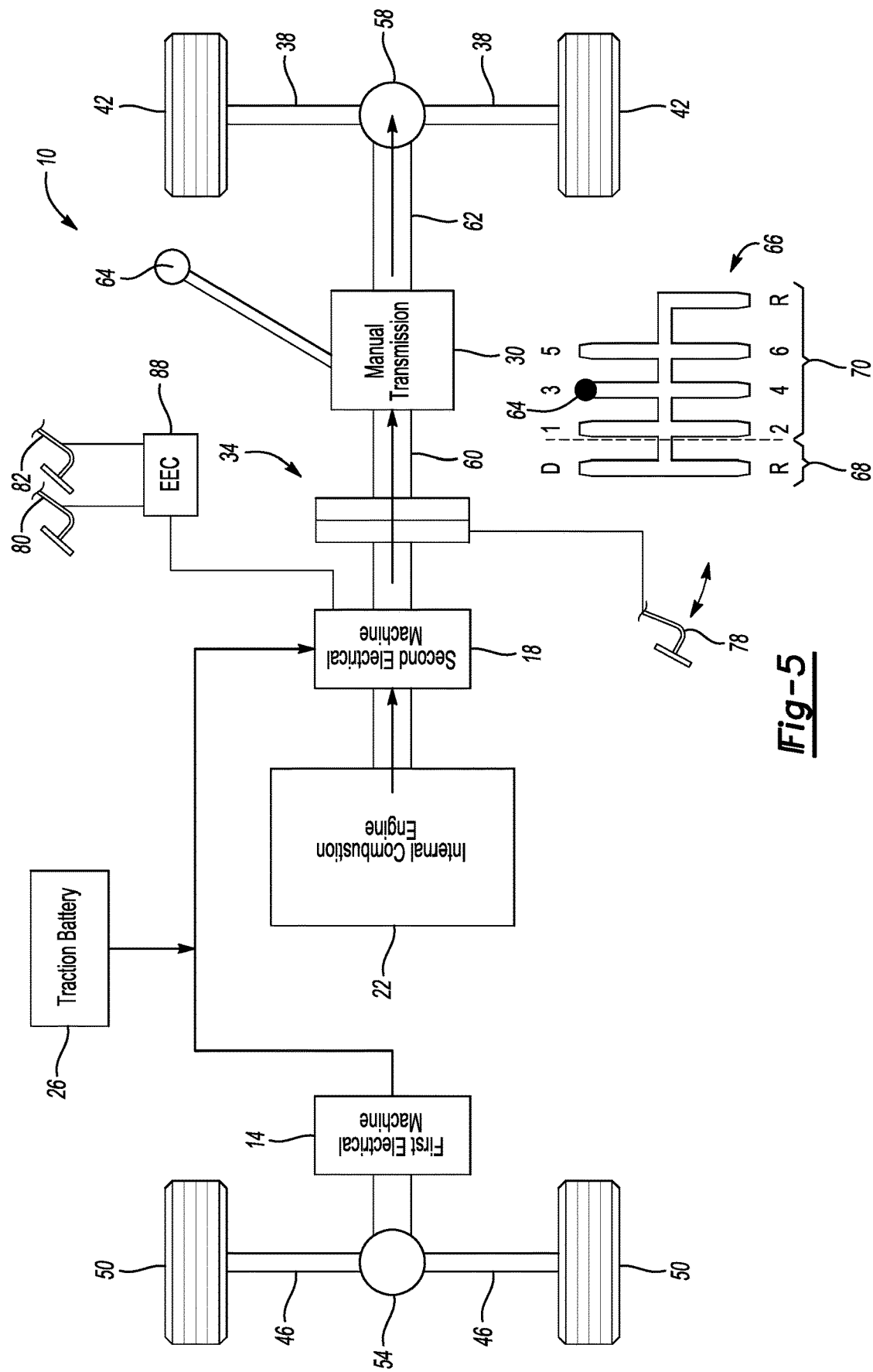
FIG. 5 schematically illustrates power flow when the FIG. 1 powertrain is in the manual transmission mode and in boosted, front wheel drive.

Referring now to FIG. 5, power flow through the powertrain 10 is shown when the powertrain 10 is in boosted, front wheel drive and while the powertrain 10 is in a manual transmission mode. In boosted, front wheel drive, both the internal combustion engine 22 and the second electric machine 18 provide output torques that drive the front wheels 42 through the differential 58. Power from the traction battery 26 is used to power the second electric machine 18 when in boosted, front wheel drive. The first electric machine 14 can remain off when the powertrain 10 is in boosted, front wheel drive.

Electric Drive

Figure 6:
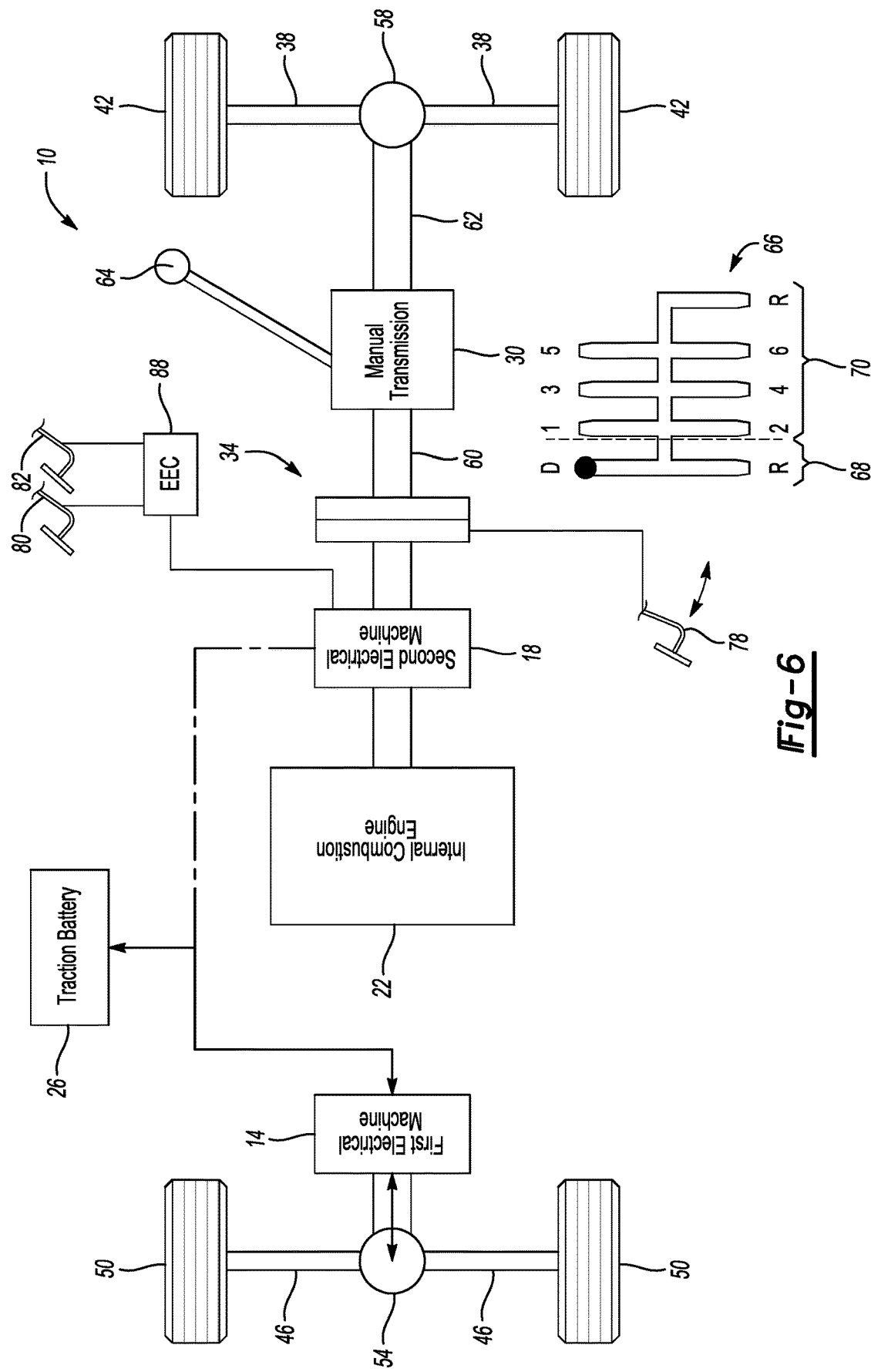
FIG. 6 schematically illustrates power flow when the FIG. 1 powertrain is in an automatic transmission mode and in electric drive.

Referring now to FIG. 6, power flow through the powertrain 10 is shown when the powertrain 10 is in electric drive and in an automatic transmission mode. In electric drive, the first electric machine 14 provides an output torque that drives the wheel driveshafts 46. The first electric machine 14 is powered by the traction battery 26. Regenerative braking the rear wheels 50 can recharge the traction battery 26 through the first electric machine 14. In electric drive, the gearshift 64 is positioned in the automatic drive region 68 of the shift gate 66, which moves the manual transmission 30 to a neutral position. The manual transmission 30 remains in neutral in electric drive.

Boosted, Electric Drive

Figure 7:
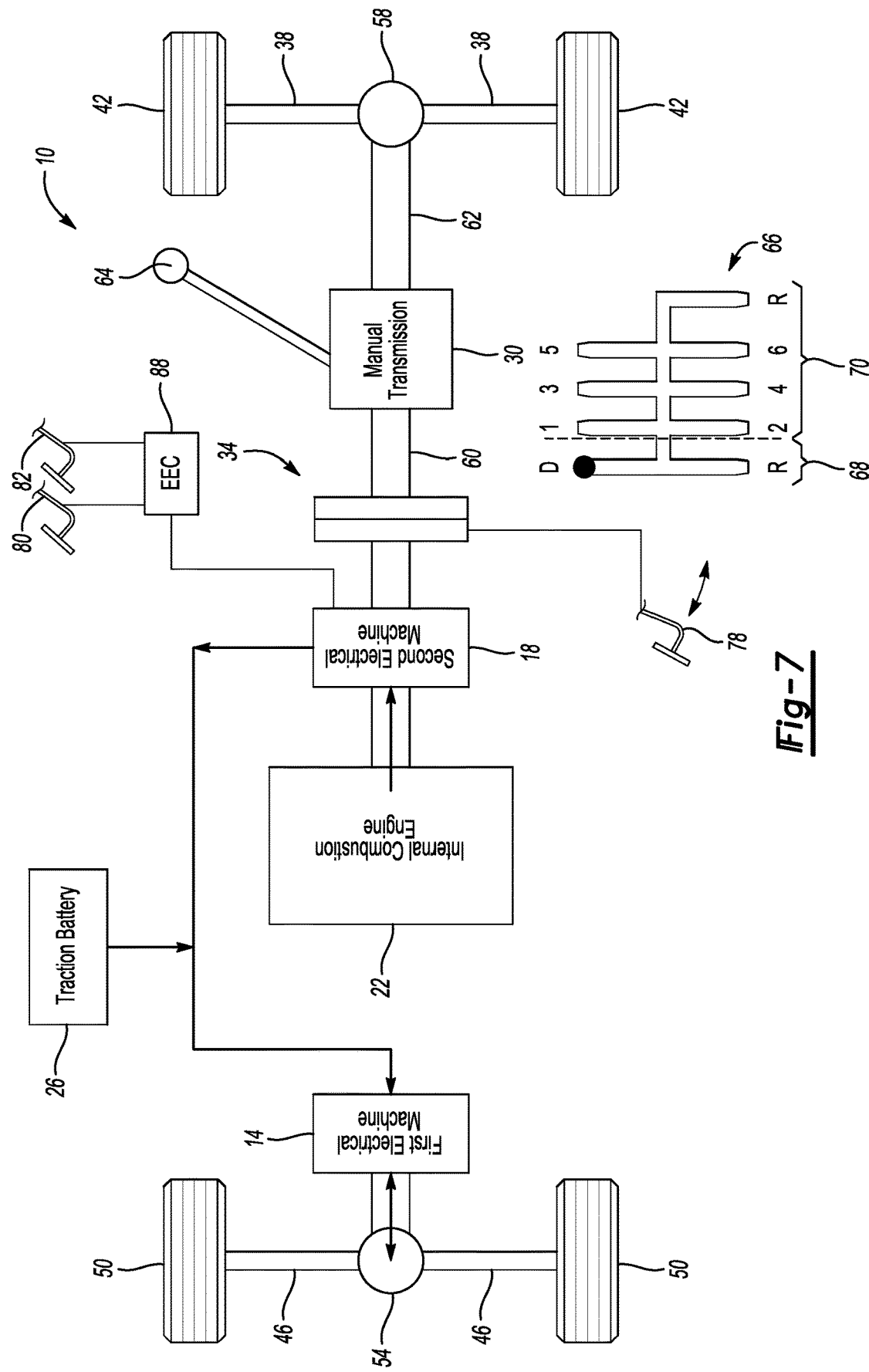
FIG. 7 schematically illustrates power flow when the FIG. 1 powertrain is in the automatic transmission mode and in boosted, electric drive.

Referring now to FIG. 7, power flow through the powertrain 10 is shown when the powertrain 10 is in boosted, electric drive and in an automatic transmission mode. In boosted electric drive, the first electric machine 14 provides output torque to drive the wheel driveshafts 46. The internal combustion engine 22 could provide an output torque that drives the second electric machine 18, which generates power to recharge the traction battery 26 or provides power along with the traction battery 26 to the first electric machine 14.

Regenerative braking the rear wheels 50 can recharge the traction battery 26 through the first electric machine 14. In boosted, electric drive, the gearshift 64 is positioned in the automatic drive region 68 of the shift gate 66, which moves the manual transmission 30 to a neutral position.

Engine Starting Assist with Clutch Disengaged

Figure 8:
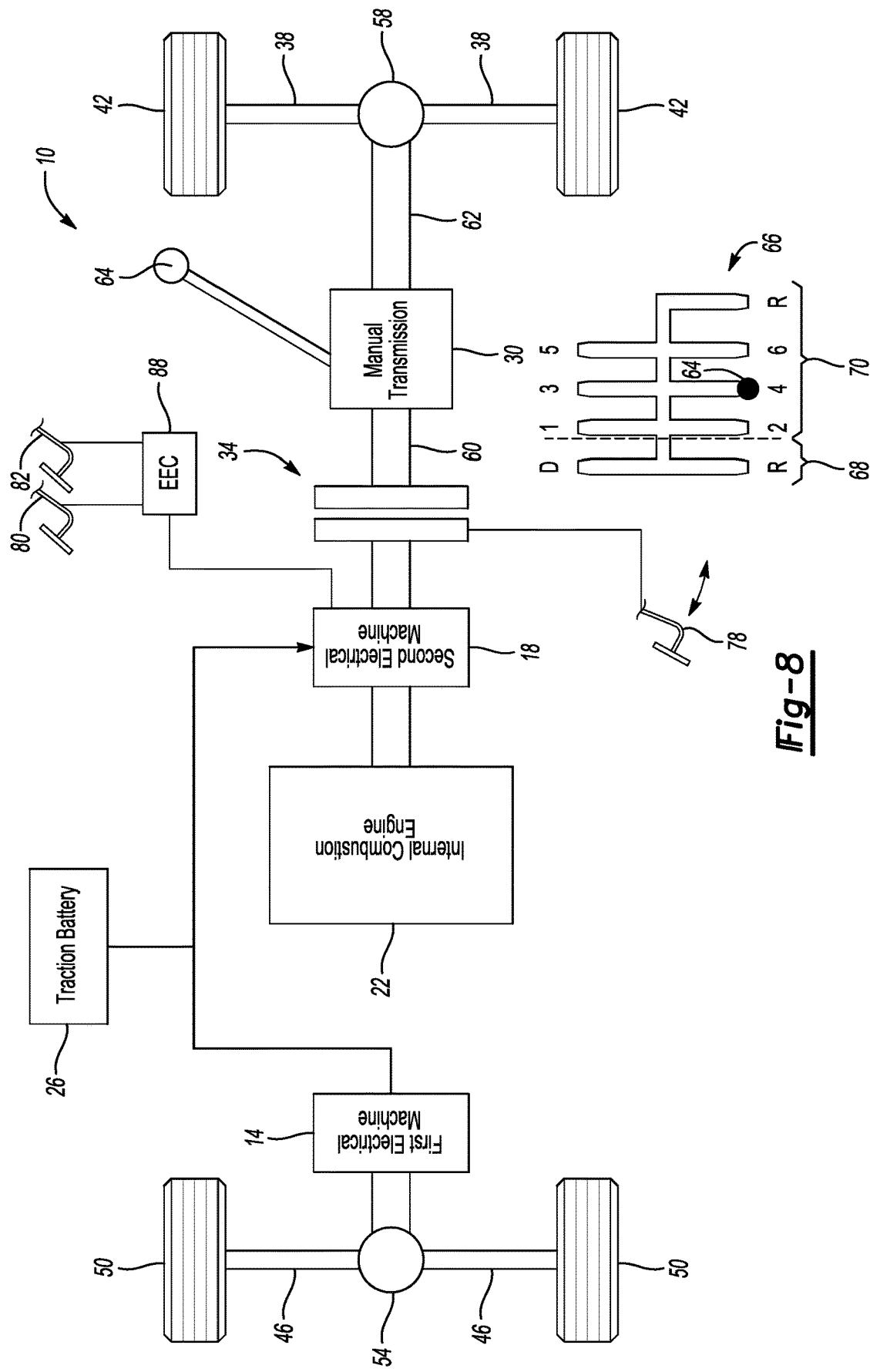
FIG. 8 schematically illustrates power flow when the FIG. 1 powertrain is facilitating a start of the engine with the clutch disengaged.

Referring to FIG. 8, power flow through the powertrain 10 is shown when facilitating a start of the engine 22 with the second electric machine 18 with the clutch 34 disengaged. Power from the traction battery 26 is used to power the second electric machine 18. The second electric machine 18 rotates to assist starting the internal combustion engine 22. The clutch 34 is disengaged. The clutch 34 can be disengaged in response to the driver depressing the clutch pedal 78.

Since the clutch 34 is disengaged, the gearshift 64 can be in any position. Here the gearshift 64 is positioned within the shift gate 66 in the manual shift region 70, but not in a gear such that the manual transmission 30 is in neutral.

Engine starting assist with the clutch 34 disengaged could be commanded by the driver of the powertrain 10 during an initial start-up at the beginning of a drive cycle. The driver could, for example, depress the clutch pedal 78 and initiate a key-on to begin the drive cycle. The second electric machine 18 then, in response, assists in starting the internal combustion engine 22.

Alternatively, engine starting assist with the clutch 34 disengaged could be triggered by a powertrain controller of the powertrain, such as an electronic engine controller (EEC) 88. The EEC 88 could trigger an engine starting assist during a drive cycle in response to the driver moving the shift lever from the automatic drive region 68 to the manual shift region 70. The clutch 34 could be disengaged, but this is not required for the engine starting assist during a drive cycle.

Engine Starting Assist with Clutch Engaged

Figure 9:
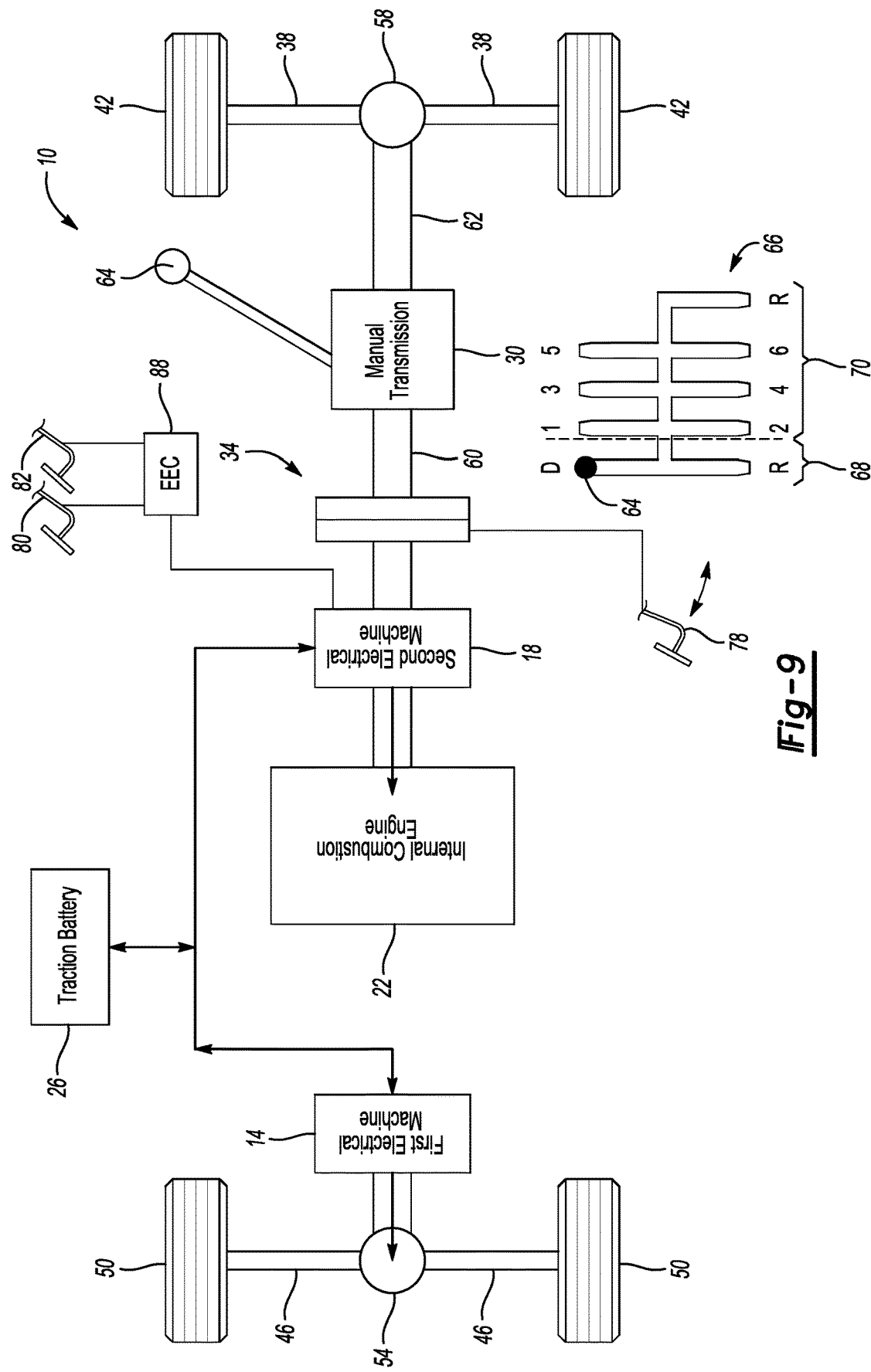
FIG. 9 schematically illustrates power flow when the FIG. 1 powertrain is facilitating a start of the engine with the clutch engaged.

Referring now to FIG. 9, power flow through the powertrain 10 is shown when facilitating a start of the internal combustion engine 22 with the second electric machine 18 with the clutch 34 engaged. Power from the traction battery 26 is used to power the second electric machine 18. The second electric machine 18 rotates to assist starting the internal combustion engine 22. The clutch 34 is engaged, but the gearshift 64 is in the automatic drive region 68 so the manual transmission 30 is in neutral.

In some examples, when engine starting assist with the clutch 34 engaged, the first electric machine 14 can provide an output torque that drives the wheel driveshafts 46. In other examples, the engine starting assists occurs when the vehicle is stationary and the first electric machine 14 is not providing an output torque that drives the wheel driveshafts 46.

The EEC 88 can cause the second electric machine 18 to assist with starting the internal combustion engine 22 in response to an increased power demand. For example, the powertrain 10 may be operating in electric drive as shown in FIG. 6, but then require more power to, for example, merge onto a highway. In response to an increased throttle demand, the EEC 88 initiates engine starting assist with the clutch 34 engaged. After the internal combustion engine 22 has started, the powertrain 10 can begin to operate in, for example, boosted, electric drive as shown in FIG. 7 to meet the increased throttle demand.

Regenerative Braking from Front and Rear Axles

Figure 10:
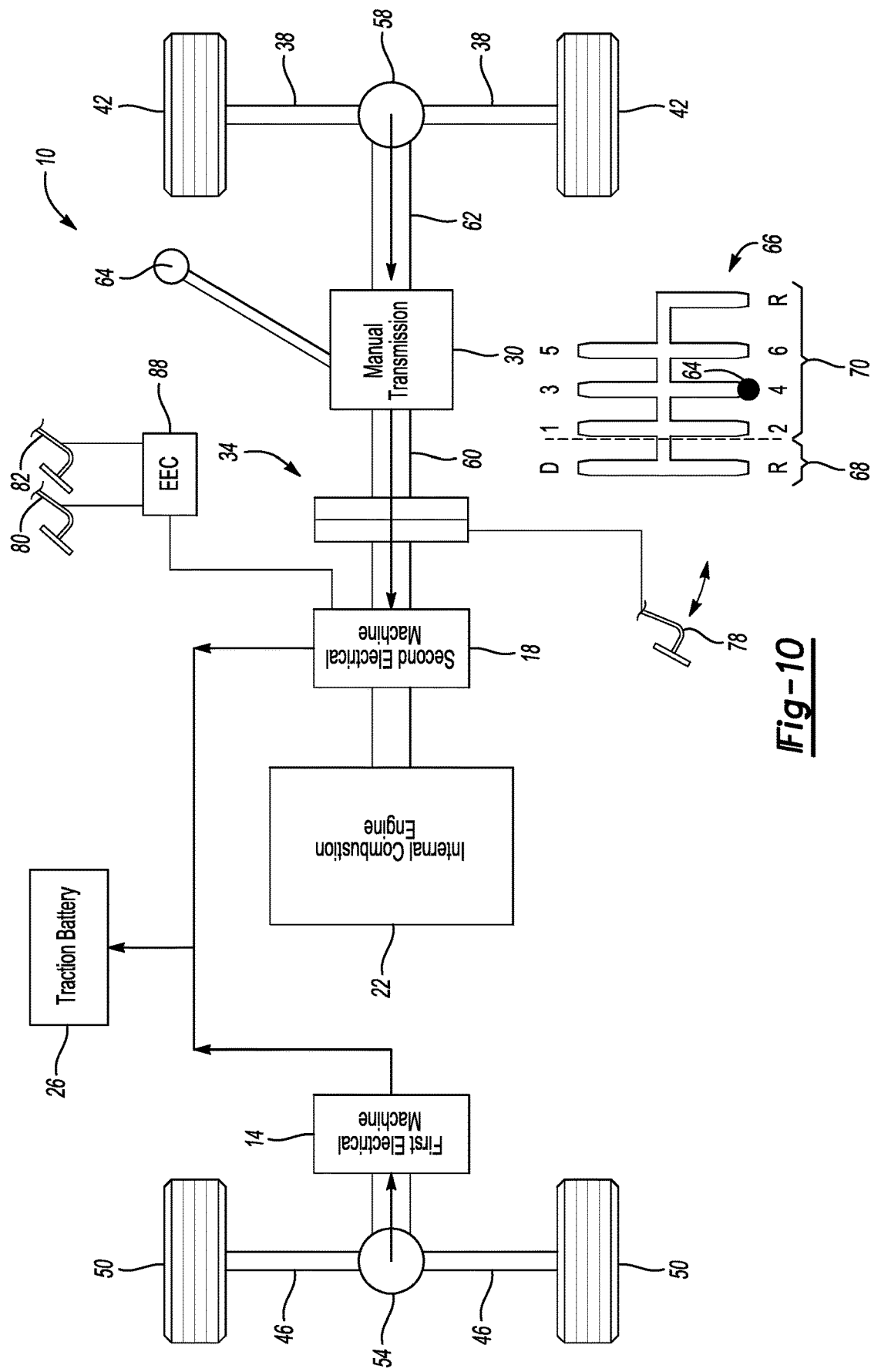
FIG. 10 schematically illustrates power flow when the FIG. 1 powertrain is regenerative braking from both the front and rear axles.

Referring to FIG. 10, power flow through the powertrain 10 is shown when the powertrain 10 is taking on power generated by regenerative braking from both the first electric machine 14 and the second electric machine 18. Slowing the front wheels 42 provides an input to the second electric machine 18 that is converted to electric power and stored within the traction battery 26. Similarly, slowing the rear wheels 50 provides a rotational input to the first electric machine 14 that is converted to electric power and stored within the traction battery 26.

The gearshift 64 can be positioned within the manual shift region 70 of the shift gate 66 when regenerative braking from the front wheels 42 and the rear wheels 50. In some examples, the driver of the vehicle may move the gearshift 64 into a specific gear slot of the manual shift region 70 to provide a desired rotational relationship between the second shaft 62 and the first shaft 60. For example, if the driver wants the first shaft 60 to rotate at a higher speed relative to the second shaft 62 during regenerative braking, the driver could position the gearshift 64 in third gear rather than fourth gear.

Regenerative Braking from Rear Axle

Figure 11:
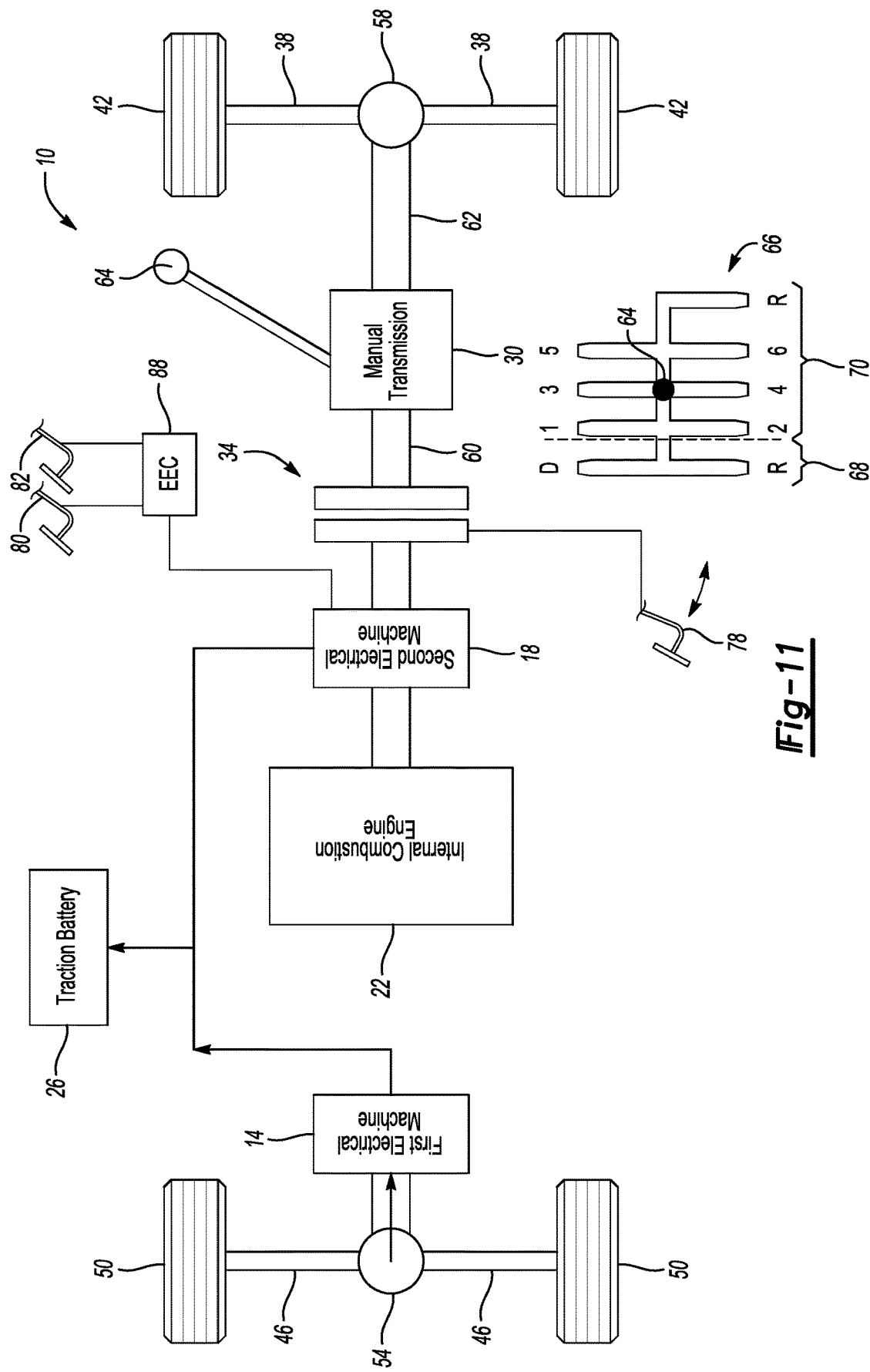
FIG. 11 schematically illustrates power flow when the FIG. 1 powertrain is regenerative braking from the rear axle.

Referring now to FIG. 11, power flow through the powertrain 10 is shown when the powertrain 10 is taking on power generated by regenerative braking from the first electric machine 14, but not the second electric machine 18. The regenerative braking slows the rear wheels 50 while the manual transmission 30 is in neutral. The gearshift 64 is in the manual shift region 70 of the shift gate 66, but is not in a gear. Thus, the manual transmission 30 is in a neutral position. Since the manual transmission 30 is in neutral, the clutch 34 can be engaged or disengaged. Regeneration from the rear wheels 50 is possible with the gear shift 64 in any position and the clutch 34 engaged or disengaged.

Referring again to FIG. 1, although the exemplary first electric machine 14 is shown in connection with the rear wheels 50 and a rear axle of the powertrain 10, another configuration of the powertrain 10 could include the first electric machine 14 repositioned to be between the manual transmission 30 and the differential 58 of the front axle. In such an example, output torque from the first electric machine 14 and the second electric machine 18 can selectively drive the wheel driveshafts 38.

Yet another configuration could include effectively reversing the configuration of the powertrain 10 such that the wheel driveshafts 46 of the rear axle are driveshafts of a front axle, and the wheel driveshafts 38 of the front axle are driveshafts of a rear axle. In such an example, the first electric machine 14 could be considered an electric front axle drive (eFAD), rather than an eRAD.

Still another configuration has electric machine 14 divided into two machines, one on each driveshaft 46 or one on each driveshaft 38. Other configurations are also possible.

The powertrain 10 and remaining portions of the vehicle can incorporate various checks when transitioning back and forth between the automatic transmission mode and the manual transmission mode. The checks can facilitate an effective transition.

For example, when the driver attempts to transition the powertrain 10 from the manual transmission mode to the automatic transmission mode, a powertrain controller, such as the EEC 88, can first confirm that a speed of the vehicle is less than a maximum potential speed when driving the vehicle using the first electric machine 14. If the speed of the vehicle is greater than maximum potential speed from the first electric machine 14, the powertrain controller may prevent shifting from the manual transmission mode to the automatic transmission mode.

After shifting from the manual transmission mode to the automatic transmission mode, the powertrain controller can continue to operate the internal combustion engine 22 to recharge the traction battery 26 through the second electric machine 18, or to operate in boosted, electric drive (FIG. 7).

Movement of the gearshift 64 from the manual shift region 70 to the automatic drive region 68 may prompt a display within the vehicle indicating to the driver that the automatic transmission mode has been selected. The display could be a visual display. Alternatively, or instead, an audible cue could indicate that the driver has shifted to the automatic transmission mode from the manual transmission mode.

When the driver depresses the accelerator pedal 80 and the powertrain 10 is in an automatic transmission mode, the first electric machine 14 generates torque to move the wheel driveshafts 46 while the wheel driveshafts 38 roll in neutral. Acceleration when the wheel driveshafts 38 are in neutral is, in some examples, limited to the capabilities of the first electric machine 14 and the traction battery 26. Accordingly, if additional acceleration is required, the powertrain controller 88 can turn on the internal combustion engine 22 using the second electric machine 18. The second electric machine 18 converts power from the internal combustion engine 22 into electric power and supplies it to the first electric machine 14. The additional acceleration demands are thus met without the driver actuating the clutch pedal 78.

When the driver depresses the brake pedal 82 to decelerate the powertrain 10 and the braking request is relatively low, the powertrain 10 can slow by regenerative braking. If additional brake forces are required, the friction brakes can be actuated to slow the vehicle with the powertrain 10.

If the traction battery 26 reaches a relatively low state of charge, the driver may be presented with a visual message, an audible message, or both indicating the relatively low state of charge. In response, the powertrain controller 88 can start the internal combustion engine 22 with the second electric machine 18 and operate the powertrain in the automatic transmission mode. The internal combustion engine 22 then drives the second electric machine 18 to recharge the traction battery 26 while the first electric machine 14 continues to rotate the wheel driveshafts 46. Notably, the first electric machine 14 is not required to rotate wheel driveshafts 46, e.g., if the vehicle is stationary If the powertrain 10 is in the automatic transmission mode, and the driver depresses the clutch pedal 78, the automatic transmission mode is deactivated by the EEC 88. Torque to the wheel driveshafts 46 is then zeroed. The torque to the wheel driveshafts 38 is already zeroed because the transmission 30 is in neutral. A message can be displayed or presented audibly to the driver indicating that the automatic transmission mode has been deactivated and the vehicle is in neutral. The driver can then move the gearshift 64 into the manual shift region 70 of the shift gate 66 and into a selected gear. If the internal combustion engine 22 is off, movement to the manual shift region 70 causes the EEC 88 to start the internal combustion engine 22. If the powertrain 10 is moving the vehicle, the internal combustion engine 22 has its revolutions matched to the gear selected by the driver. The revolution matching could be done either manually by the driver or by the EEC 88 using the second electric machine 18 to control the engine speed. In some examples, the lower gears may be locked out based on speed of the vehicle.

Figure 12:
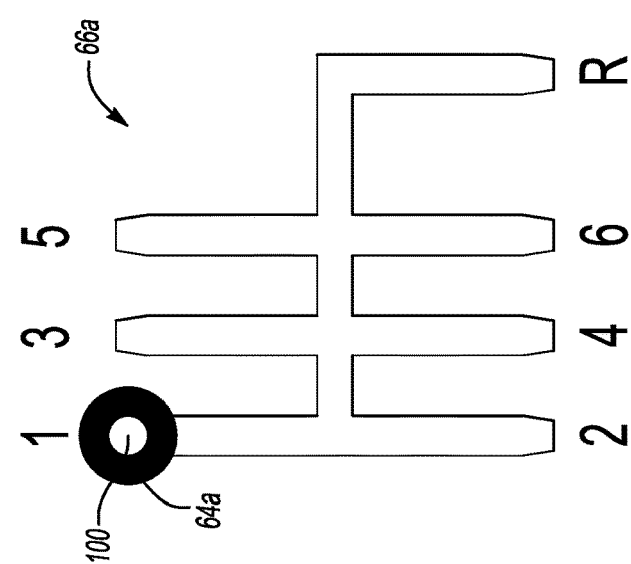
FIG. 12 illustrates a shift gate for use in connection with the powertrain of FIGS. 1 to 11 according to another exemplary embodiment.

Referring now to FIG. 12 with continuing reference to FIG. 1, another example shift gate 66a for the powertrain 10 is used in connection with a gearshift 64a having a button 100. The driver depresses the button 100 to transition the powertrain 10 between operating in the automatic transmission mode and the manual transmission mode. That is, if the powertrain 10 is operating in the automatic transmission mode, the driver can press the button 100 to begin operating the powertrain 10 in the manual transmission mode where the driver can manually shift between the gears of the manual transmission 30. When the driver wishes to return the powertrain 10 to the automatic transmission mode, the driver presses the button 100 again. In this example, actuating the button 100 would require the shift lever 64 to be in a position corresponding to the transmission being in neutral.

Figure 13:
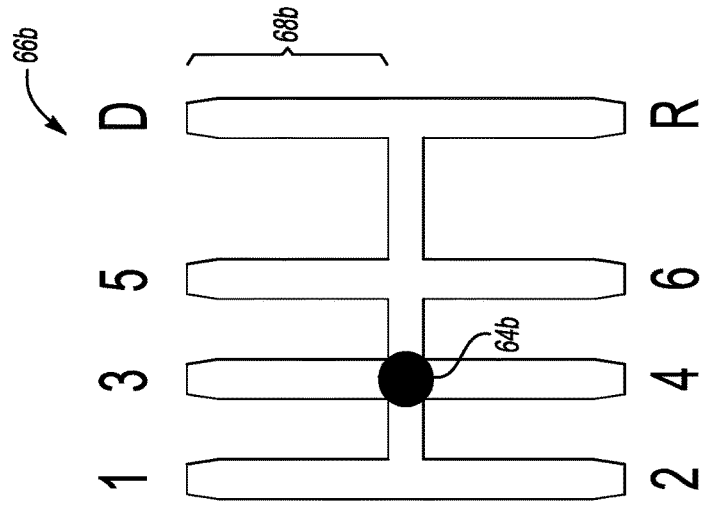
FIG. 13 illustrates a shift gate for use in connection with the powertrain of FIGS. 1 to 11 according to yet another exemplary embodiment.

Referring now to FIG. 13 with continuing reference to FIG. 1, another example shift gate 66b for the powertrain 10 is used in connection with a gearshift 64b. The shift gate 66b includes an automatic drive region 68b with only a forward drive gear. Moving the gearshift 64b to the automatic drive region 68b from gears 1, 2, 3, 4, 5, 6, or R transitions the powertrain 10 from a manual transmission mode to an automatic transmission mode.

Figure 14:
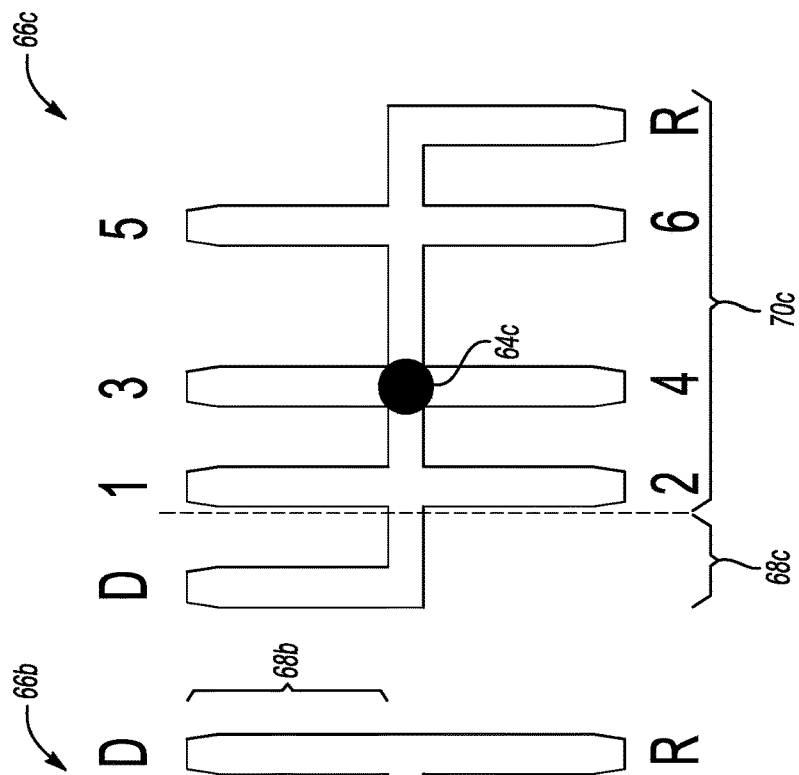
FIG. 14 illustrates a shift gate for use in connection with the powertrain of FIGS. 1 to 11 according to still another exemplary embodiment.

Referring now to FIG. 14 with continuing reference to FIG. 1, another example shift gate 66c for the powertrain 10 is used in connection with a gearshift 64c. The shift gate 66c includes an automatic drive region 68c with only a forward drive gear. Moving the gearshift 64c to the automatic drive region 68c from gears 1, 2, 3, 4, 5, 6, or R in the manual transmission region 70c transitions the powertrain 10 from a manual transmission mode to an automatic transmission mode. The reverse R gear is located on an opposite side of the shift gate 66c from the automatic drive region 68c.

Some features of examples disclosed above include providing a powertrain that enables the driver to move a vehicle without requiring manual shifting or actuating a clutch pedal, while also providing the driver with an option to switch to a mode where an internal combustion engine drives the vehicle through a manual transmission that the driver can manually shift.

Permitting both manual transmission and automatic transmission modes can reduce wear on the clutch and can facilitate driving a manual transmission vehicle in relatively demanding scenarios such as heavy traffic, city driving, and other low-speed conditions, as no shifting or clutch use is required. More precise low-speed control of the vehicle is also enabled, and quietness is enhanced when driving electrically.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A powertrain assembly, comprising:
   a first electric machine that selectively drives one or more wheel driveshafts within a plurality of wheel driveshafts;
   a second electric machine that, through a manual transmission, selectively drives one or more wheel driveshafts within the plurality of wheel driveshafts;
   an engine that, through the manual transmission, selectively drives the same wheel driveshafts selectively driven by the second electric machine; and
   a gearshift moveable between an automatic drive region and a manual shift region, the manual transmission in neutral when the gearshift is in the automatic drive region.

2. The powertrain assembly of claim 1, wherein the one or more wheel driveshafts selectively driven by the first electric machine are first wheel driveshafts, and the one or more wheel driveshafts selectively driven by the second electric machine are second wheel driveshafts, wherein a first axle of a vehicle comprises the first wheel driveshafts, and a second axle of the vehicle comprises the second wheel driveshafts.

3. The powertrain assembly of claim 2, wherein the first axle is a rear axle of the vehicle and the second axle is a front axle of the vehicle.

4. The powertrain assembly of claim 1, wherein the one or more wheel driveshafts selectively driven by the first electric machine are the same as the one or more wheel driveshafts selectively driven by the second electric machine.

5. The powertrain assembly of claim 1, wherein the engine selectively drives the second electric machine to generate electrical power that charges a traction battery, powers the first electric machine, or both.

6. The powertrain assembly of claim 1, further comprising a clutch that moves between an engaged position where the engine and the second electric machine are rotatably coupled to the manual transmission, and a disengaged position where the engine and the second electric machine are rotatably decoupled from the manual transmission.

7. The powertrain assembly of claim 1, wherein the manual transmission includes a plurality of selectable gear positions, each providing a different gear ratio through which the engine, the second electric machine, or both can drive the one or more wheel driveshafts.

8. The powertrain assembly of claim 1, further comprising a powertrain controller configured to selectively start the second electric machine to assist with starting the engine.

9. The powertrain assembly of claim 1, wherein the first electric machine is configured to charge a traction battery with power generated by regenerative braking the one or more wheel driveshafts selectively driven by the first electric machine, and the second electric machine is configured to charge the traction battery with power generated by regenerative braking the one or more wheel driveshafts selectively driven by the second electric machine through the manual transmission.

10. The powertrain assembly of claim 1, wherein the engine is configured to start automatically in response to a movement of the gearshift from the automatic drive region to the manual drive region.

11. The powertrain assembly of claim 1, further comprising a shift gate providing the automatic drive region and the manual shift region.

12. The powertrain assembly of claim 11, wherein the automatic drive region includes no more than a single gear position and that single gear position is a forward drive gear position.

13. The powertrain assembly of claim 11, wherein the automatic drive region lacks a reverse drive gear position.

14. The powertrain assembly of claim 13, wherein a reverse drive gear position is in the manual shift region and is located on an opposite side of the shift gate from the automatic drive region.

15. A powertrain assembly, comprising:
a first electric machine that selectively drives one or more wheel driveshafts within a plurality of wheel driveshafts;
a manual transmission;
a second electric machine that, through the manual transmission, selectively drives one or more wheel driveshafts within the plurality of wheel driveshafts;
an engine that, through the manual transmission, selectively drives the same wheel driveshafts selectively driven by the second electric machine; and
a gearshift configured to transition a powertrain assembly between an automatic transmission mode and a manual transmission mode, wherein the manual transmission is in neutral when the powertrain assembly is in the automatic drive mode.

16. The powertrain assembly of claim 15, further comprising a button of the gearshift, the button configured to be activated to transition the powertrain assembly between the automatic transmission mode and the manual transmission mode.

17. The powertrain assembly of claim 15, further comprising a shift gate having an automatic drive region and a manual drive region, the gearshift moveable between the automatic drive region and the manual shift region, wherein the powertrain assembly is in the automatic transmission mode when the gearshift is in the automatic drive region of the shift gate, wherein the powertrain assembly in the manual transmission mode when the gearshift is in the manual drive region of the shift gate.

18. The powertrain assembly of claim 17, wherein the engine is configured to start automatically in response to a movement of the gearshift from the automatic drive region to the manual drive region.

19. The powertrain assembly of claim 17, wherein the automatic drive region lacks a reverse drive gear position.

* * * * *